(12) United States Patent
Yamada

(10) Patent No.: US 8,953,225 B2
(45) Date of Patent: Feb. 10, 2015

(54) IMAGE READING DEVICE

(75) Inventor: Kazutaka Yamada, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 161 days.

(21) Appl. No.: 13/410,635

(22) Filed: Mar. 2, 2012

(65) Prior Publication Data

US 2013/0027756 A1   Jan. 31, 2013

(30) Foreign Application Priority Data

Jul. 29, 2011 (JP) .............................. 2011-167013

(51) Int. Cl.
*H04N 1/40* (2006.01)
*H04N 1/00* (2006.01)
*H04N 1/12* (2006.01)

(52) U.S. Cl.
CPC ....... *H04N 1/00766* (2013.01); *H04N 1/00708* (2013.01); *H04N 1/00716* (2013.01); *H04N 1/00732* (2013.01); *H04N 1/00737* (2013.01); *H04N 1/00771* (2013.01); *H04N 1/00777* (2013.01); *H04N 1/00803* (2013.01); *H04N 1/00824* (2013.01); *H04N 1/1235* (2013.01)
USPC ........................................................ 358/448

(58) Field of Classification Search
USPC .................................... 358/448; 271/265.02
See application file for complete search history.

(56) References Cited

U.S. PATENT DOCUMENTS

| 2007/0139707 A1* | 6/2007 | Takami et al. ............... 358/1.15 |
| 2007/0195378 A1 | 8/2007 | Yoshida |
| 2009/0019347 A1* | 1/2009 | Noguchi et al. ............. 715/200 |
| 2010/0091344 A1* | 4/2010 | Simonis et al. ............... 358/474 |
| 2010/0187753 A1* | 7/2010 | Suzuki ....................... 271/265.02 |
| 2010/0328739 A1* | 12/2010 | Saida ........................... 358/498 |
| 2011/0148925 A1* | 6/2011 | Yano ............................ 345/634 |

FOREIGN PATENT DOCUMENTS

| JP | 2007-081841 A | 3/2007 |
| JP | 2007-221246 A | 8/2007 |
| JP | 2007-226350 A | 9/2007 |
| JP | 2007-226353 A | 9/2007 |

(Continued)

OTHER PUBLICATIONS

Japan Patent Office, Office Action for Japanese Patent Application No. 2011-167013 (counterpart to above-captioned patent application), mailed May 7, 2013.

(Continued)

*Primary Examiner* — Vincent Rudolph
*Assistant Examiner* — Michael Burleson
(74) *Attorney, Agent, or Firm* — Baker Botts L.L.P.

(57) ABSTRACT

An image reading device includes a feeding unit, a reading unit, and a processor. The feeding unit is configured to feed a plurality of sheets of original document one by one. The reading unit is configured to read an image on each of the plurality of sheets fed by the feeding unit and generate image data representing the image. The processor is configured to function as a selecting unit and a determining unit. The selecting unit is configured to select a criterion from among a plurality of criteria. The determining unit is configured to determine, according to the criterion selected by the selecting unit, whether or not a sheet of the original document is actually fed while being overlapped with another sheet of the original document based on image data corresponding to the sheet.

20 Claims, 9 Drawing Sheets

(56) References Cited

FOREIGN PATENT DOCUMENTS

| JP | 2008-072281 A | | 3/2008 | |
|----|---------------|---|--------|------------|
| JP | 2008072281 | * | 3/2008 | ........... H04N 1/00 |
| JP | 2010-173798 A | | 8/2010 | |

OTHER PUBLICATIONS

Japan Patent Office, Final Rejection for Japanese Patent Application No. 2011-167013 (counterpart to above-captioned patent application), mailed Jan. 16, 2014.

* cited by examiner

FIG.12

SPECIFY DETERMINATION CRITERIA

DETERMINATION CRITERIA

☑ PAGE NUMBERS CHANGES DISCONTINOUSLY.

☑ PAGE NUMBERS AND ORDER IN WHICH DOCUMENT SHEET HAVE BEEN READ ARE UNMATCHED.

☑ SIZE OF DOCUMENT SHEET CHANGES.

☑ AT LEAST ONE OF MARGIN AREA SIZE AND IMAGE AREA SIZE CHANGES.

☑ ORDER IN WHICH COLOR IMAGE DATA IS GENERATED IS UNMATCHED WITH SPECIFIED ORDER.
PAGE NUMBER [　　　　　　　　　　]

☑ ORDER IN WHICH MONOCHROME IMAGE DATA IS GENERATED IS UNMATCHED WITH SPECIFIED ORDER.
PAGE NUMBER [　　　　　　　　　　]

☑ NUMBER OF SHEETS THAT HAS BEEN READ IS NOT IDENTICAL TO INPUTTED SHEET NUMBER.
SHEET NUMBER [　　　　　　　　　　]

[ OK ]　　[ CANCEL ]

US 8,953,225 B2

IMAGE READING DEVICE

CROSS REFERENCE TO RELATED APPLICATION

This application claims priority from Japanese Patent Application No. 2011-167013 filed Jul. 29, 2011. The entire content of the priority application is incorporated herein by reference.

TECHNICAL FIELD

The present invention relates to an image reading device.

BACKGROUND

A conventional image reading device reads, one by one, a plurality of document sheets each on which a page number appears to generate image data and determines that page missing has occurred when the page numbers extracted from the generated image data increase or decrease irregularly.

SUMMARY

The page missing occurs when a multifeed in which a plurality of document sheets are fed while being overlapped has occurred. Thus, in the conventional image reading device, whether the sheet multifeed has occurred or not can be determined by determining the presence/absence of the page missing. However, the page number does not always appear on the document sheet. Thus, depending on the document type, there is a case where the conventional image reading device cannot determine whether the multifeed has occurred or not.

In view of the foregoing, it is an object of the invention to provide an image reading device capable of determining an occurrence of the sheet multifeed reliably.

In order to attain the above and other objects, the invention provides an image reading device including a stack portion, a feeding unit, a reading unit, and a processor. An original document including a plurality of sheets is stacked in the stack portion. The feeding unit is configured to feed the plurality of sheets one by one. The reading unit is configured to read an image on each of the plurality of sheets fed by the feeding unit and generate image data representing the image. The processor is configured to function as a selecting unit and a determining unit. The selecting unit is configured to select a criterion from among a plurality of criteria. Each of the plurality of criteria is a criterion for determining whether or not a sheet of the original document is fed while being overlapped with another sheet of the original document. The determining unit is configured to determine, according to the criterion selected by the selecting unit, whether or not a sheet of the original document is actually fed while being overlapped with another sheet of the original document based on image data corresponding to the sheet.

According to another aspect, the present invention provides a non-transitory computer readable storage medium storing a set of program instructions installed on and executed by a computer. The program instructions comprises: selecting a criterion from among a plurality of criteria, each of the plurality of criteria being a criterion for determining whether or not a sheet of an original document is fed by a feeder of an image reading device while being overlapped with another sheet of the original document; and determining, according to the selected criterion, whether or not a sheet of the original document is actually fed while being overlapped with another sheet of the original document based on image data corresponding to the sheet.

According to another aspect, the present invention provides a method executed by a computer, the method including: selecting a criterion from among a plurality of criteria, each of the plurality of criteria being a criterion for determining whether or not a sheet of an original document is fed by a feeder of an image reading device while being overlapped with another sheet of the original document; and determining, according to the selected criterion, whether or not a sheet of the original document is actually fed while being overlapped with another sheet of the original document based on image data corresponding to the sheet.

BRIEF DESCRIPTION OF THE DRAWINGS

The particular features and advantages of the invention as well as other objects will become apparent from the following description taken in connection with the accompanying drawings, in which:

FIG. 12 is an explanatory diagram showing an example of a criterion specifying screen displayed on a display unit of the image reading device;

DETAILED DESCRIPTION

Figure 1:
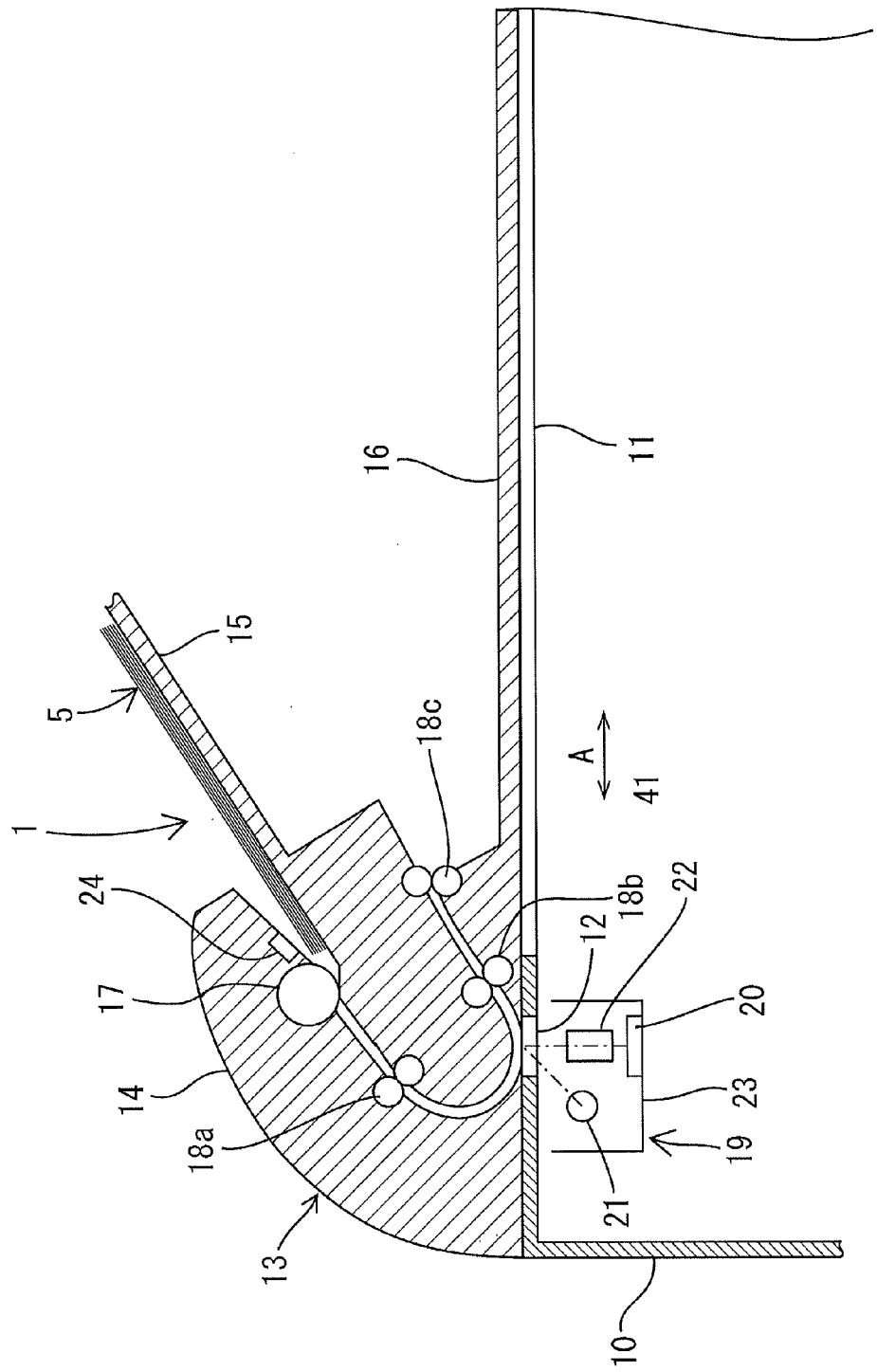
FIG. 1 is a cross-sectional view showing an image reading device including an image reading device according to a first embodiment of the present invention.

An image reading device according to a first embodiment of the invention will be described while referring to FIG. 1 through 13. As shown in FIG. 1, an image scanner 1 is an image scanner having a compact image sensor (CIS) configured to read an original document by using one-to-one ration optical system.

As shown in FIG. 1, the image scanner 1 includes a casing 10 formed in a box-shape substantially, a first platen glass 11 and a second platen glass 12, a cover 13, and a reading unit 19. The first and second platen glasses 11, 12 are provided on an upper part of the casing 10 and arranged in parallel to each other. The cover 13 is linked to the casing 10 so as to rotate between an open position in which the cover 13 reveals the first and second platen glasses 11 and 12 and a close position in which the cover 13 covers the first and second platen glasses 11 and 12. The cover 13 includes an auto document feeder (ADF) 14, a stack tray 15 on which the original document 5 including a plurality of sheets, and a discharge tray 16.

The ADF 14 includes a feed roller 17, a plurality of pairs of rollers 18a, 18b, and 18c, and an ADF motor 34 (FIG. 2) for driving the feed roller 17 and the plurality of pairs of rollers 18a, 18b, and 18c. The feed roller 17 and the rollers 18a, 18b, and 18c feed the plurality of sheets of original document 5 stacked on the stack tray 15 one by one. Each sheet fed by the feed roller 17 and the rollers 18a, 18b, and 18c passes above the second platen glass 12.

The reading unit 19 includes an image sensor 20 having a plurality of light-receiving elements arranged linearly in a direction orthogonal to the surface of the drawing in FIG. 1 (a main scanning direction); a light source 21 having light-emitting diodes for the three RGB colors; a rod lens array 22 focusing a reflected light from the light source 21 reflected off the original document 5 onto each of the light-receiving elements of the image sensor 20; a carriage 23 on which the image sensor 20, light source 21, and rod lens array 22 are mounted.

When reading the document sheet placed on the first platen glass 11, the image scanner 1 carries the reading unit 19 by an FB motor 32 (see FIG. 2) in a sub-scan direction (directions A in FIG. 1) parallel to the first platen glass 11 and reads a sheet of the original document one line by one line while sequentially changing the color of a light source 21. When reading the document sheet fed by the ADF 14, the image scanner 1 halts the reading unit 19 directly below the second platen glass 12 and reads the document sheet one line by one line while changing the color of the light source 21.

In the cover 13, a sheet thickness detection sensor 24 is provided. The sheet thickness detection sensor 24 is a sensor for detecting the thickness of the original document 5 stacked on the stack tray 15. As the sheet thickness detection sensor 24, a sensor having a protruding section and an output section may be used. The protruding section has distal end abutting with an uppermost sheet of the original document 5 from above. The output section is configured to output a detection signal according to the protruding length of the protruding section.

Figure 2:
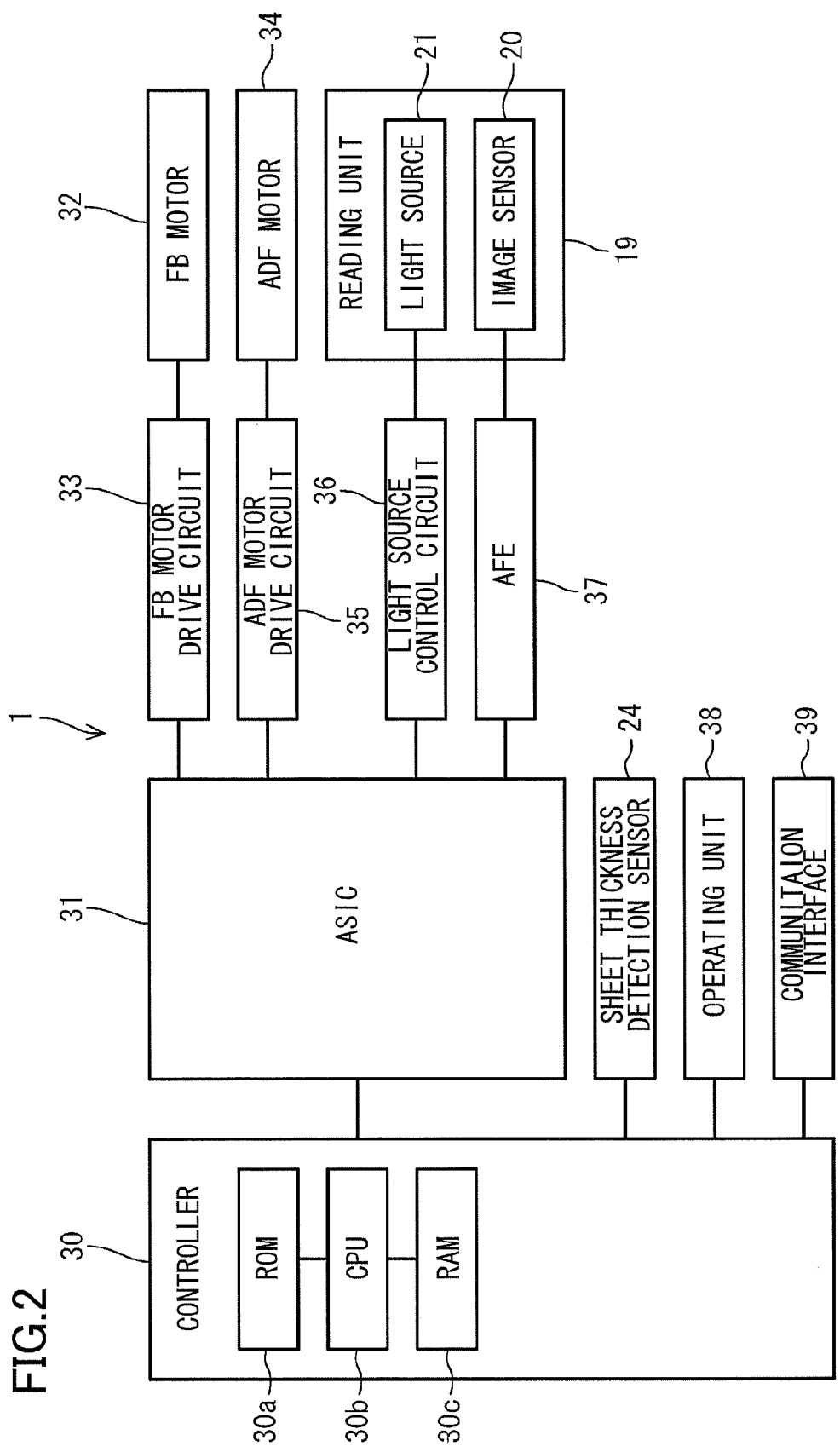
FIG. 2 is a block diagram showing an electrical structure of the image reading device.

FIG. 2 is a block diagram illustrating an electrical configuration of the image scanner 1. The image scanner 1 includes a controller 30, an ASIC 31, the FB motor 32, an FB motor drive circuit 33, an ADF motor 34, an ADF motor drive circuit 35, the reading unit 19, a light source control circuit 36, an AFE (Analog Front End) 37, the sheet thickness detection sensor 24, an operating unit 38, and a communication interface 39.

The controller 30 includes a ROM 30a, a CPU 30b, and a RAM 30c. The CPU 30b executes various programs stored in the ROM 30a to control individual components of the image scanner 1. The ROM 30a stores a read control program executed by the CPU 30b and various data including a plurality of determination criteria described below. The RAM 30c is used as a main storage device for the CPU 30b to execute various processing.

The ASIC 31 is connected with the FB motor drive circuit 33, ADF motor drive circuit 35, light source control circuit 36, and AFE 37. The ASIC 31 controls the above components under the control of the CPU 30b and applies gamma correction, shading correction, and other various image processing to an output value (pixel value) output from the AFE 37 to generate image data having RGB three color densities for each pixel.

The AFE 37 is a circuit that converts an analog output value output from the image sensor 20 into a digital output value. The operating unit 38 includes a plurality of buttons, a display unit such as a liquid crystal display, and a drive circuit for driving the display unit. The communication interface 39 is an interface connected to a communication network such as a LAN (Local Area Network), a USB (Universal Serial Bus), or a parallel line so as to allow the image scanner 1 to perform communication with an external device such as a personal computer.

The ADF 14 is configured to feed the document sheets stacked on the stack tray 15 one by one as described above. However, so-called a multifeed in which a plurality of document sheets is fed while being overlapped may occur. In order to cope with this, the controller 30 according to the first embodiment selects one from a plurality of criteria for determining whether the sheet multifeed occurs or not which are prepared according to a feature of the document sheet and determines whether the multifeed has occurred using the selected criterion.

(Criterion 1)

Figure 3:
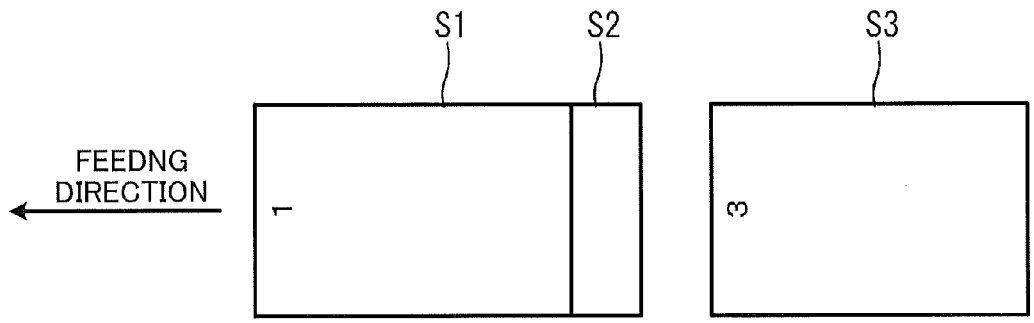
FIG. 3 is an exemplary diagram illustrating how to determine whether or not a multifeed is occurred according to a criterion 1.

FIG. 3 is an exemplary view for explaining a criterion 1. The criterion 1 is a criterion for determining the multifeed which is prepared assuming a feature of the original document that a page number appears on all the document sheets. Note that "feature of the original document 5" can be translated into "attribute of the original document 5".

In the illustrated example shown in FIG. 3, a first sheet S1 and a second sheet S2 are multi-fed. As shown in FIG. 3, the page number presented on the second sheet S2 is covered by the first sheet S1, with the result that the page number presented on the second sheet S2 is not read. In this case, the page numbers acquired from the image data generated as a result of reading of the sheets S1 to S3 are "1, 3", resulting in discontinuous page numbers.

Thus, in the criterion 1, the occurrence of the multifeed is determined when there is a discontinuous change in the page numbers. In other words, a difference between two page numbers acquired from two sets of image data generated consecutively is greater than one, a sheet corresponding to a page number between the two page numbers is actually fed while being overlapped with a sheet corresponding to one of the two page numbers. Note that the page numbers need not start from 1 but the page numbers are only necessary to increase or decrease by one from a page number presented on a document sheet that has first been read.

(Criterion 2)

Figure 4:
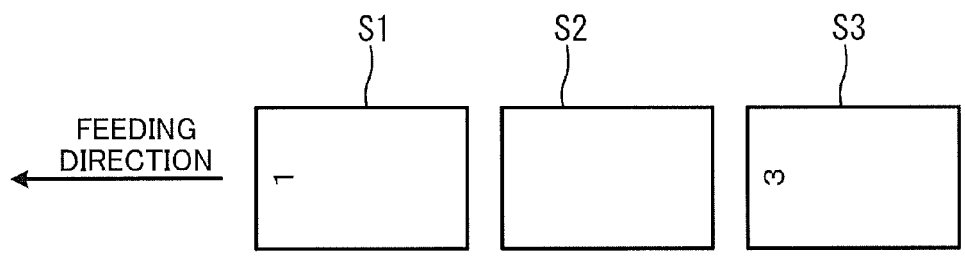
FIG. 4 is an exemplary diagram illustrating how to determine whether or not a multifeed is occurred according to a criterion 2.

FIG. 4 is an exemplary view for explaining a criterion 2. The criterion 2 is a criterion for determining the multifeed which is prepared assuming a feature of the original document that document sheets each on which the page number appears and document sheets each on which the page number is absent are mixed.

In the illustrated example, the page number appears on a first sheet S1 and a third sheet S3, while the page number is absent on a second sheet S2. In this case, the page numbers are discontinuous even when the multifeed has not occurred but a page number "1" extracted from image data generated as a result of reading of the first sheet S1 and an order "1" in which the first sheet S1 has been read correspond to each other. Similarly, a page number "3" extracted from image data generated as a result of reading of the third sheet S3 and an order "3" in which the third sheet S3 has been read correspond to each other.

Thus, in the criterion 2, even when the page numbers are discontinuous, determination is made that the multifeed has not occurred when the page number of the document sheet on which the page number appears and an order in which this document sheet has been read correspond to each other; while the occurrence of the multifeed is determined when the page number and order in which this document sheet has been read do not correspond to each other. In other words, a sheet whose page is unmatched with a reading order in which the reading unit 19 reads the plurality of sheets of original document 5 is determined to be actually fed while being overlapped with another sheet.

Note that the page numbers need not start from 1. For example, assume that a document sheet whose page number has first been extracted is a first document sheet and that the page number thereof is "34". In this case, in the case where a document sheet whose page number has secondly been extracted is an eighth document sheet ((1+7)-th document sheet) and where the page number extracted from the eighth document sheet is "41" (34+7 pages), it can be determined that the page number of the document sheet on which the page number appears and order in which this document sheet has been read correspond to each other.

(Criterion 3)

Figure 5:
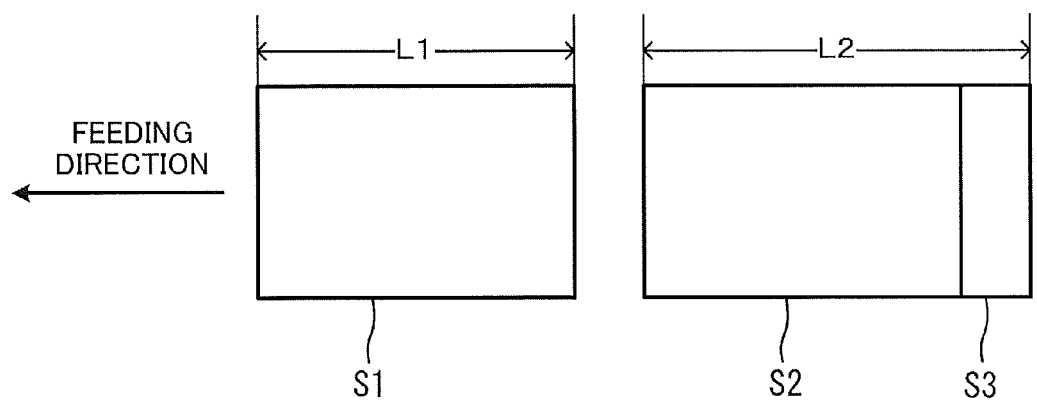
FIG. 5 is an exemplary diagram illustrating how to determine whether or not a multifeed is occurred according to a criterion 3.

FIG. 5 is an exemplary view for explaining a criterion 3. The criterion 3 is a criterion for determining the multifeed which is prepared assuming a feature of the original document that document sheets of the original document 5 have the same size.

In the illustrated example, a second sheet S2 and a third sheet S3 are multi-fed. Here, a length (hereinafter, referred to as "sheet size") of the document sheet in the feeding direction is detected. For a first sheet S1, a length L1 from the leading end to rear end of the first sheet S1 in the feeding direction is detected as the sheet size of the first sheet S1; while for the second sheet S2 (overlapped with the sheet S3), a length L2 from the feeding direction leading end of the second sheet S2 to feeding direction rear end of the third sheet S3 is detected as the sheet size of the second sheet S2. That is, the sheet size differs between the first sheet S1 and second sheet S2. In other words, a sheet (S2 in the example) having a size different from the size of the first sheet S1 is actually fed while being overlapped with another sheet (S1 in the example) of the original document.

Thus, in the criterion 3, the occurrence of the multifeed is determined when there is a change in the sheet size. Note that the sheet size may be detected by acquiring the number of pixels from the generated image data or may be detected by means of a known sheet sensor (not illustrated) provided on the feeding path of the ADF 14.

(Criterion 4)

Figure 6:
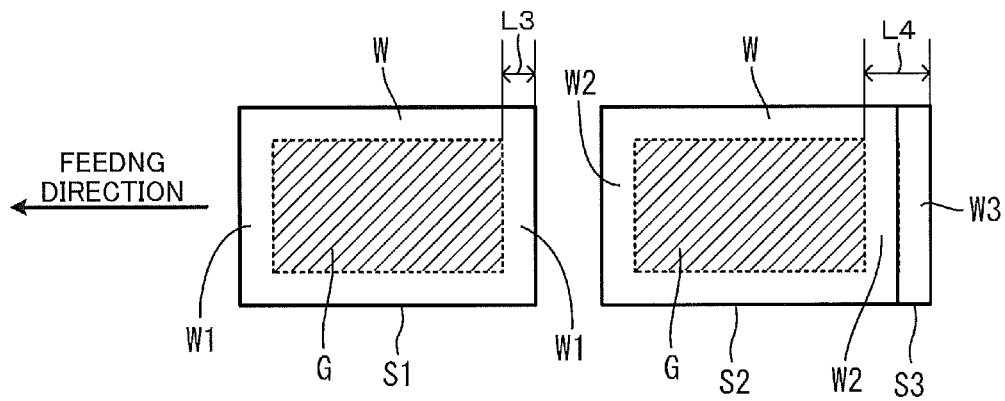
FIG. 6 is an exemplary diagram illustrating an example of method for determining whether or not a multifeed is occurred according to a criterion 4.

FIG. 6 is an exemplary view for explaining a criterion 4. The criterion 4 is a criterion for determining the multifeed which is prepared assuming a feature of the original document 5 that at least one of a length (hereinafter, referred to as "margin area size") of a margin area of the document sheet in the feeding direction and a length (hereinafter, referred to as "image area size") of an image area which is the area other than the margin area is the same between the document sheets.

In each document sheet, a margin area W is set along the periphery, and an image has been printed in an image area G surrounded by the margin area W. In the illustrated example, a second sheet S2 and a third sheet S3 are multi-fed, so that a margin area W2 of the second sheet S2 on the feeding direction rear end side and a margin area W3 of the third sheet S3 on the feeding direction leading end side are combined to each other. In this case, the feeding direction size of a margin area W1 of a first document sheet S1 on the feeding direction rear end side is detected as L3; while, the feeding direction size of a margin area W2 of the second sheet S2 (overlapped with the third sheet S3) on the feeding direction rear end side is detected as L4 obtained by adding the size of the margin area W2 and that of the margin area W3 of the third document sheet S3 on the feeding direction leading end side. That is, the size of the margin area on the feeding direction rear end side differs between the first sheet S1 and second sheet S2.

Figure 7:
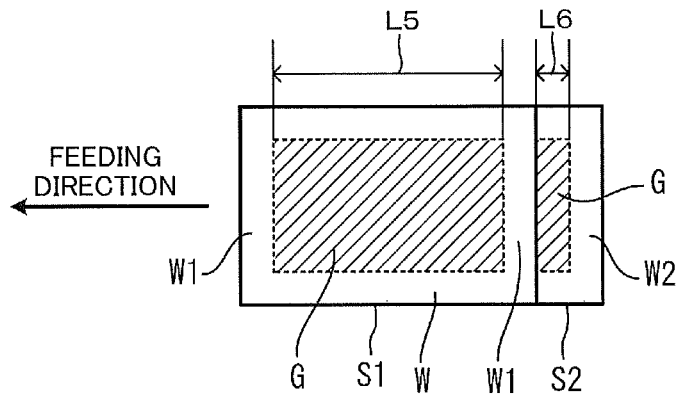
FIG. 7 is an exemplary diagram illustrating another example of method for determining whether or not a multifeed is occurred according to the criterion 4.

FIG. 7 is another exemplary view for explaining the criterion 4. In the illustrated example, the first sheet S1 and second sheet S2 are multi-fed, so that a part of the image area G in the second sheet S2 is covered by the first sheet S1. In this case, the size of the image area G of the second sheet S2 in the feeding direction is detected as L6 which is the length of the image area G of the second sheet S2 that is not covered by the first sheet S1. That is, the size of the image area G differs between the first sheet S1 and second sheet S2.

Thus, in the criterion 4, the occurrence of the multifeed is determined when there is a change in at least one of the margin area size and image area size. Note that the margin area size and image area size are each detected from a result of the document sheet reading performed by the reading unit 19.

(Criterion 5)

In a criterion 5, the occurrence of the multifeed is determined when the number of the document sheets that have been read by the reading unit 19 does not coincide with a value representing the number of the document sheets input by a user. In the case where the criterion 5 is used, the image scanner 1 receives an input of the value representing the number of the document sheets stacked on the stack tray 15 from the user. Although the details will be described later, in this first embodiment, the image scanner 1 receives the above input only when the number of the document sheets included in the original document 5 is less than a threshold value. This is because the large number of the document sheets makes it hard for the user to count the number of the document sheets. Thus, a use of the criterion 5 is limited to the case where the number of the document sheets is less than the threshold value.

(Criterion 6)

Figure 8:
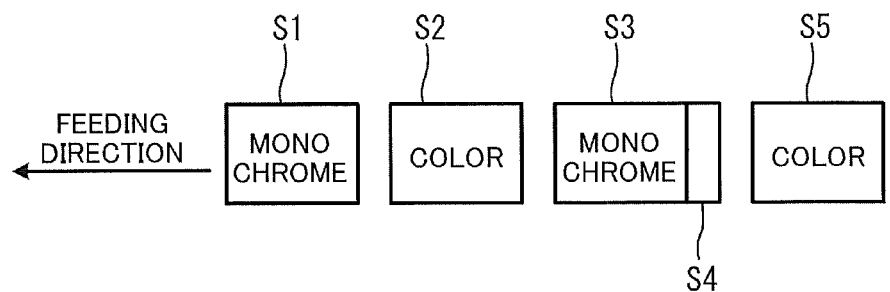
FIG. 8 is an exemplary diagram illustrating how to determine whether or not a multifeed is occurred according to a criterion 6.

FIG. 8 is an exemplary view for explaining a criterion 6. In the illustrated example, sheets S1, S3, and S5 are monochrome image document sheets, and sheets S2 and S4 are color image document sheets. In this case, the user specifies "1, 3, 5" as the order of the document sheets for which monochrome image data are generated and/or specifies "2, 4" as the order of the document sheets for which color image data are generated.

Assuming that the third sheet S3 and fourth sheet S4 are multi-fed as illustrated in FIG. 8 and thus the content on the fourth sheet S4 can hardly be read, the fifth sheet S5 is read as the fourth sheet S4 to generate the monochrome image data as the fourth image data although the color image data is generated as the fourth sheet under normal circumstances. That is, the order in which the monochrome image data is generated does not coincide with the user specified order.

Thus, in the criterion 6, the occurrence of the multifeed is determined when at least one of the order in which the color image data is generated and order in which the monochrome image data is generated does not coincide with the user specified order.

The image scanner 1 according to the first embodiment analyzes image data generated as a result of reading of the first document sheet or first and second document sheets to determine the feature of the original document 5 and selects the criterion for determining whether the multifeed has occurred or not based on the determined feature. Note that the number of document sheets to be read for the determination of the feature may be set arbitrarily.

The criterion may be selected based on the feature directly or indirectly determined from the image data generated as a result of reading of the first document sheet or first and second document sheets.

The selection based on the direct determination is, for example, to actually extract the page numbers from the image data generated as a result of reading of a part of the original document 5 and select the criterion 2 when the page numbers can be extracted. This is because the original document 5 can be assumed to have the feature "document sheets each on which the page number appears and document sheets each on which the page number is absent are mixed". Similarly, the criterion 3 is selected when the sheet size is the same between the plurality of read document sheets, and criterion 4 is selected when the margin area size is the same between the plurality of document sheets.

The reason why assuming that the original document 5 has the feature "document sheets each on which the page number appears and document sheets each on which the page number is absent are mixed" is because a conclusion that "page number appears on all the document sheets" cannot be drawn since even when the page number appears on the first and second document sheets, "the page number appears on all the document sheets" is not always true.

The selection based on the indirect determination is to analyze the image data to recognize specified information such as a specific character string, and select the criterion associated with the character string when the specific character string can be recognized.

For example, in the case where the image data generated as a result of reading of the part of the original document 5 is analyzed to recognize a character string "Publication of Unexamined Patent Application", the criterion 1 is selected. This is because the page numbers appearing on all the document sheets can be assumed in the case of the publication of unexamined patent application. In this selection, not the page number is extracted from the image data, but the character string "Publication of Unexamined Patent Application" is recognized, so that whether the page number appears or not on the part of the original document 5 is indirectly determined.

Further, for example, in the case where the image data is analyzed to recognize a character string "Weekly", the criterion 2 is selected. This is because pages each on which the page number appears and pages like photo pages or graphic pages each on which the page number is absent are mixed in the case of the weekly magazine can be assumed.

Further, for example, in the case where the image data is analyzed to recognize a character string "Voucher", the criterion 3 is selected. This is because the document sheets have the same size in the case of the document that has a fixed form, such as the voucher can be assumed.

The above-described combination between the specific character string and criterion is merely illustrative. Because even if a specific character string is included, it does not necessarily mean that the document group has a feature corresponding to the specific character string. The character string and its corresponding criterion may be configured to be set by the user. Further, the criterion may be associated with a specific graphic pattern or a specific format in place of the specific character string.

The user may place a template document for feature determination on the top of the original document 5 so as to reduce a possibility that it is erroneously determined that the original document 5 does not have the above-mentioned feature even though the feature is actually possessed by the part of the original document 5. The template document highlights the feature that the part of the original document 5 has in order to allow the image scanner 1 to determine the feature with higher accuracy.

For example, in the case where the original document 5 in which the page number appears on each document is read, a template document on which the page number is clearly written in large letters may be placed on the top of the original document 5. This allows the image scanner 1 to extract page numbers from the image data more reliably to thereby reduce the possibility of erroneously determining that the page number does not appear on the document sheets of the original document 5 even though the page number actually appears.

Further, for example, the publication of unexamined patent application is read, a template document on which the character string "Publication of Unexamined Patent Application" is clearly written in large letters may be placed on the top of the original document 5. This can reduce the possibility of erroneously determining that the character string "Publication of Unexamined Patent Application" does not appear on the document sheets of the original document 5 even though actually appears.

Alternatively, in the case where the document sheets have the same margin area size, two sheets of template document each in which the margin area and image area are clearly separated from each other are used. This can reduce the possibility of erroneously determining that the document sheets have different margin area sizes even though they actually have the same margin area size. The template document thus placed is read as the above-mentioned "the part of original the document".

Figure 9:
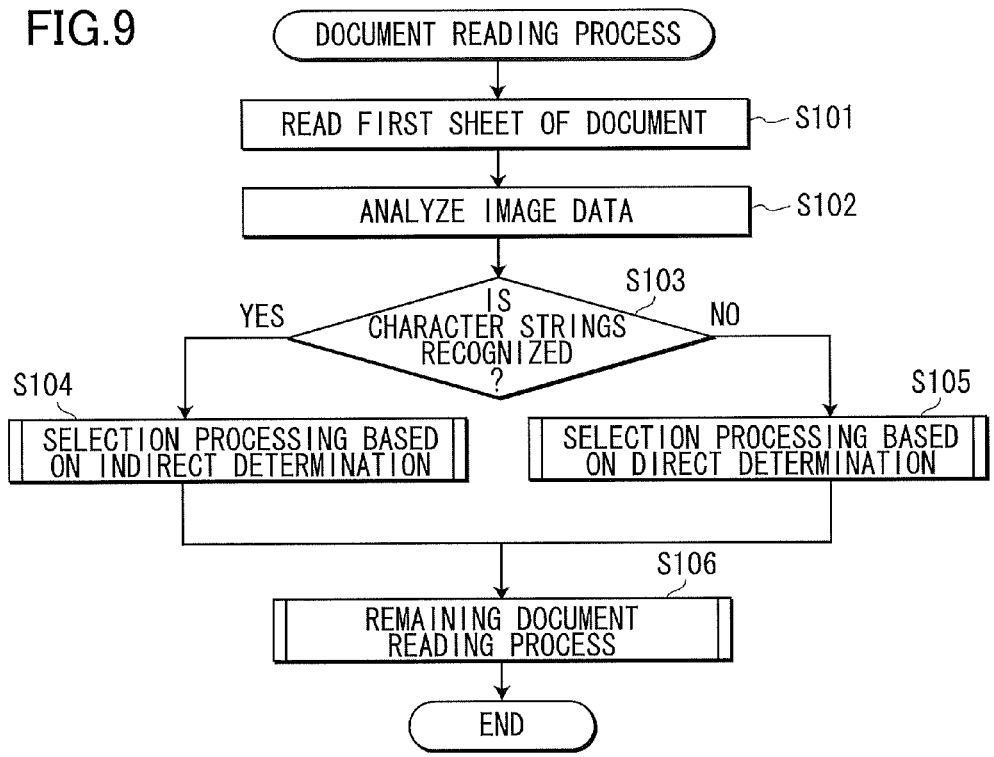
FIG. 9 is a flowchart illustrating steps in a document reading process executed by the image reading device.

Next, a document reading process will be explained with referring to FIG. 9. The document reading process is started when the user inputs a document reading instruction through the operating unit 38.

In S101, the CPU 30*b* executing the read control program stored in ROM 30*a* (hereinafter, referred to merely as "CPU 30*b*") controls and allows the individual components of the image scanner 1 to read the first document sheet. Specifically, the image scanner 1 feeds the plurality of sheets one by one and reads an image on each of the plurality of sheets fed by the rollers and generates the image data representing the image data in S101. In the case where the user places the template document on the top of the original document 5, the template document is read as the first document sheet.

In S102, the CPU 30*b* analyzes the image data generated as a result of reading of the first document sheet. In this analysis, the CPU 30*b* performs extraction of the page number, detection of the sheet size, detection of the margin area size, detection of the image area size, and recognition of the specific character string. In the case of the first embodiment, the specific character strings used are "Publication of Unexamined Patent Application", "Weekly", and "Voucher" which are hard-coded in the read control program.

In S103, the CPU 30b determines whether or not any of the character strings "Publication of Unexamined Patent Application", "Weekly", and "Voucher" has been recognized in the analysis of S102. When a result of the determination is affirmative, the CPU 30b proceeds to S104; while when the determination result is negative, the CPU 103b proceeds to S105.

In S104, the CPU 30b executes "selection processing based on indirect determination" of indirectly determining the feature possessed by the part of the original document 5 to select the criterion.

In S105, the CPU 30b executes "selection processing based on direct determination" of directly determining the feature possessed by the part of the original document 5 to select the criterion.

In S106, the CPU 30b executes remaining document reading process of reading the remaining document sheets stacked on the stack tray 15 and thereafter ends the document reading process.

Figure 10:
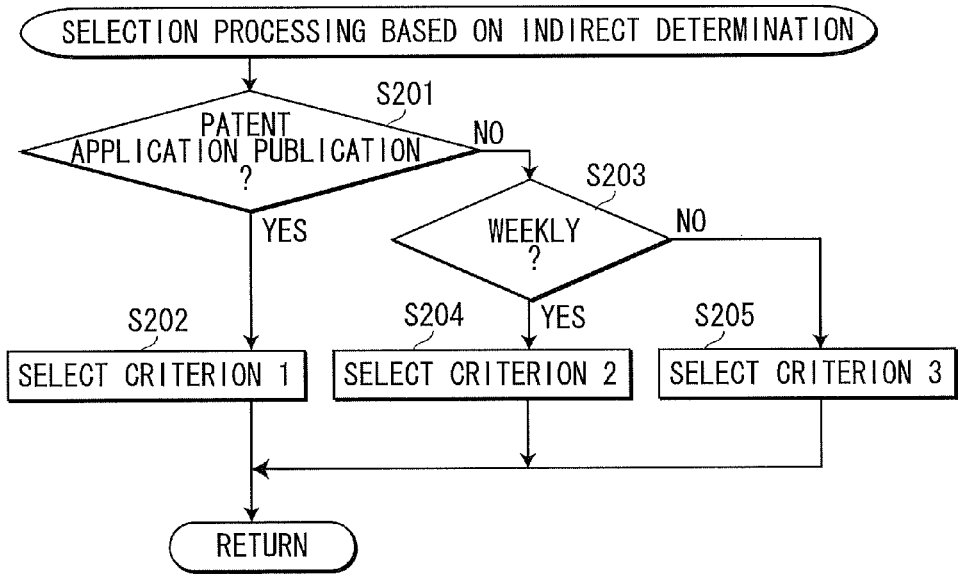
FIG. 10 is a flowchart illustrating a selection processing based on indirect determination in the document reading process.

In S104, the CPU 30b executes the selection processing based on the indirect determination shown in FIG. 10. In S201, the CPU 30b determines whether the character string "Publication of Unexamined Patent Application" has been recognized in the analysis of S102. When a result of the determination is affirmative, the CPU 30b proceeds to S202; while when the determination result is negative, the CPU 103b proceeds to S203.

In S202, the CPU 30b selects the criterion 1. As described above, the presence of the character string "Publication of Unexamined Patent Application" allows the assumption that the original document 5 has the feature "page number appears on all the document sheets". Therefore, the criterion 1 corresponding to this feature is selected.

In S203, the CPU 30b determines whether the character string "Weekly" has been recognized in the analysis of S102. When a result of the determination is affirmative, the CPU 30b proceeds to S204; while when the determination result is negative, the CPU 103b proceeds to S205.

In S204, the CPU 30b selects the criterion 2. As described above, the presence of the character string "Weekly" allows the assumption that the original document 5 has the feature "document sheets each on which the page number appears and document sheets each on which the page number is absent are mixed". Therefore, the criterion 2 corresponding to this feature is selected.

In S205, the CPU 30b determines that the character string "Voucher" has been recognized to select the criterion 3. As described above, the presence of the character string "Voucher" allows the assumption that the original document 5 has the feature "document sheets of the original document 5 have the same size". Therefore, the criterion 3 corresponding to this feature is selected.

Figure 11:
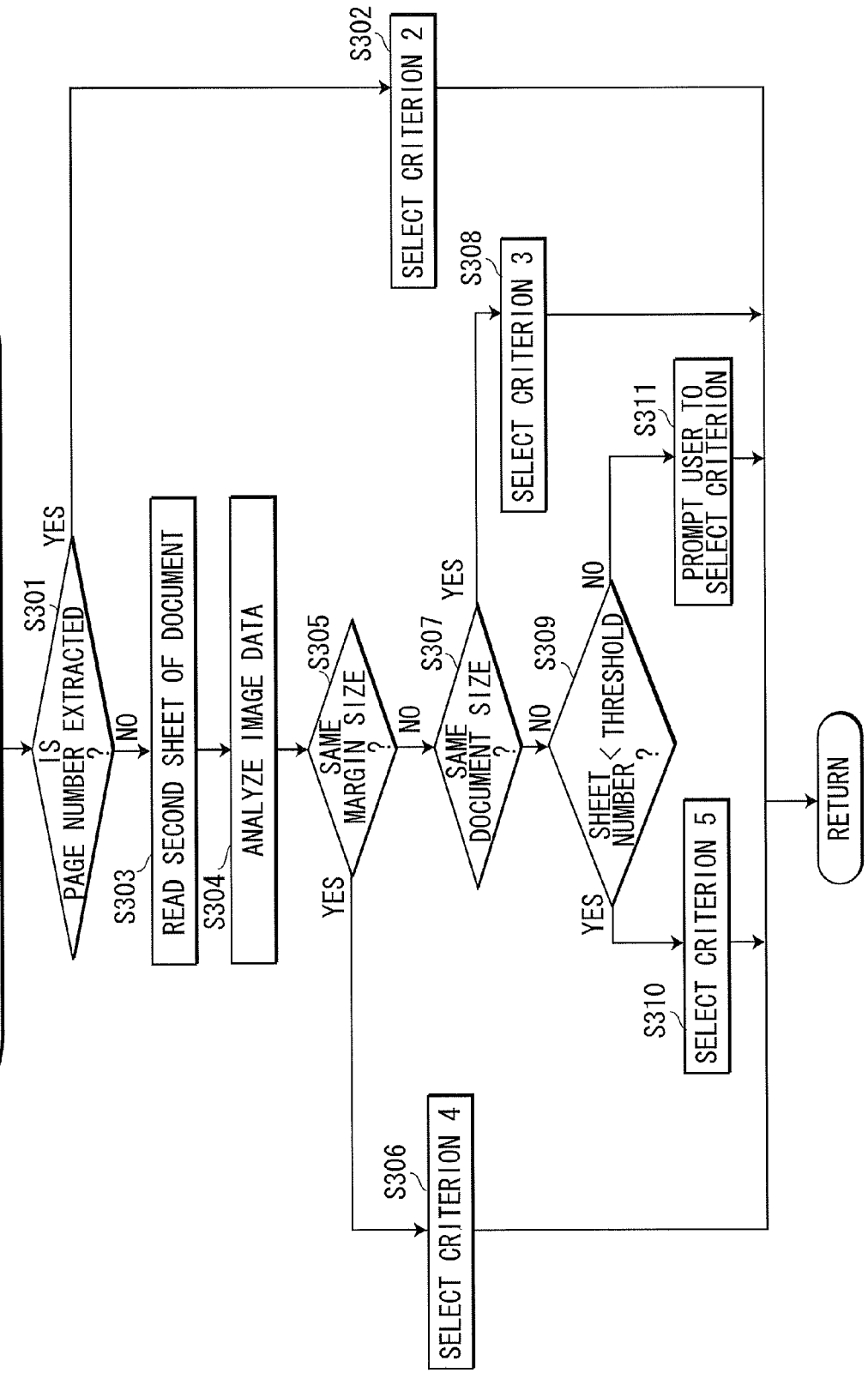
FIG. 11 is a flowchart illustrating a selection processing based on direct determination in the document reading process.

Next, the selection processing based on the direct determination executed in S105 will be explained with referring to FIG. 11. In S301, the CPU 30b determines whether the page number has been extracted from the first sheet of original document 5 in the analysis of S102. When a page number is extracted from image data corresponding to the first sheet, that is, when the first sheet includes a page number therein, the CPU 30b proceeds to S302. When a page number is not extracted from image data corresponding to the first sheet, the CPU 30b proceeds to S303.

In S302, the CPU 30b selects the criterion 2. As described above, the presence of the page number allows the assumption that the original document 5 has the feature "document sheets each on which the page number appears and document sheets each on which the page number is absent are mixed". Therefore, the criterion 2 corresponding to this feature is selected.

In S303, the CPU 30b controls and allows the individual components of the image scanner 1 to read the second document sheet. In the case where the user places two sheet of template document on the top of the original document, the second template document is read as the second document sheet.

In S304, the CPU 30b analyzes the image data generated as a result of reading of the second document sheet. In this analysis, the CPU 30b performs detection of the sheet size, detection of the margin area size, and detection of the image area size.

In S305, the CPU 30b determines whether the margin area size detected in S304 is identical to the margin area size detected in the analysis of S102 and whether the image area size detected in S304 is identical to the image area size detected in the analysis of S102. When at least one of results of the determinations is affirmative, the CPU 30b proceeds to S306; while when both determination results are negative, the CPU 30b proceeds to S307.

In S306, the CPU 30a selects the criterion 4. As described above, when at least one of the margin area size and image area size is the same between the document sheets read as the part of the original document 5, it can be assumed that the original document 5 has the feature "at least one of the margin area size and image area size is the same between the document sheets". Therefore, the criterion 4 corresponding to this feature is selected.

In S307, the CPU 30b determines whether the sheet size detected in S304 coincides with the sheet size detected in the analysis of S102, in other words, whether or not the second sheet has the size same as the size of the first sheet. When the size of second sheet is same as the size of the first sheet, the CPU 30b proceeds to S308. When the size of second sheet is different from the size of the first sheet, the CPU 30b proceeds to S309.

In S308, the CPU 30b selects the criterion 3. As described above, when the sheet size is the same between the document sheets read as the part of the original document 5, it can be assumed that the original document 5 has the feature "document sheets of the original document 5 have the same size". Therefore, the criterion 3 corresponding to this feature is selected.

In S309, the CPU 30b determines whether the number of document sheets stacked on the stack tray 15 is less than a threshold value. Specifically, the CPU 30b acquires a detection signal from the sheet thickness detection sensor 24 and determines the number of the document sheets from a thickness value represented by the acquired detection signal.

When the number of the document sheets is less than a threshold value, the CPU 30b proceeds to S310; while when the number of the document sheets is more than a threshold value, the CPU 30b proceeds to S311. Setting an excessively large threshold value may make it hard for the user to count the number of the document sheets, so the threshold value is preferably set in a range that does not impose a burden on the user.

In S310, the CPU 30b selects the criterion 5. Thereafter, the CPU 30b displays a sheet number input screen (not shown) for receiving a value indicative of the number of the document sheets from the user on the operating unit 38 and prompts the user to input the number of the document sheets. When the inputted value is identical to a data number of image data generated by the reading unit 19, the CPU 30b determines that a multifeed has occurred.

In S311, the CPU 30b displays a criterion specifying screen 52 to be described below on the operating unit 38 to prompt the user to specify the criterion and selects the criterion specified by the user.

FIG. 12 is an exemplary view illustrating an example of the criterion specifying screen 52. The user selects a checkbox corresponding to the criterion to thereby specify the criterion. As illustrated, the user can specify a plurality of the criteria.

Further, when "image data of specified page number is not color page" is specified, the user inputs orders in which the color image data are generated, and when "image data of specified page number is not monochrome image page", the user inputs orders in which the monochrome image data are generated. Similarly, when "specified number of document sheets differs from the number of read document sheets", the user inputs the number of the document sheets.

Figure 13:
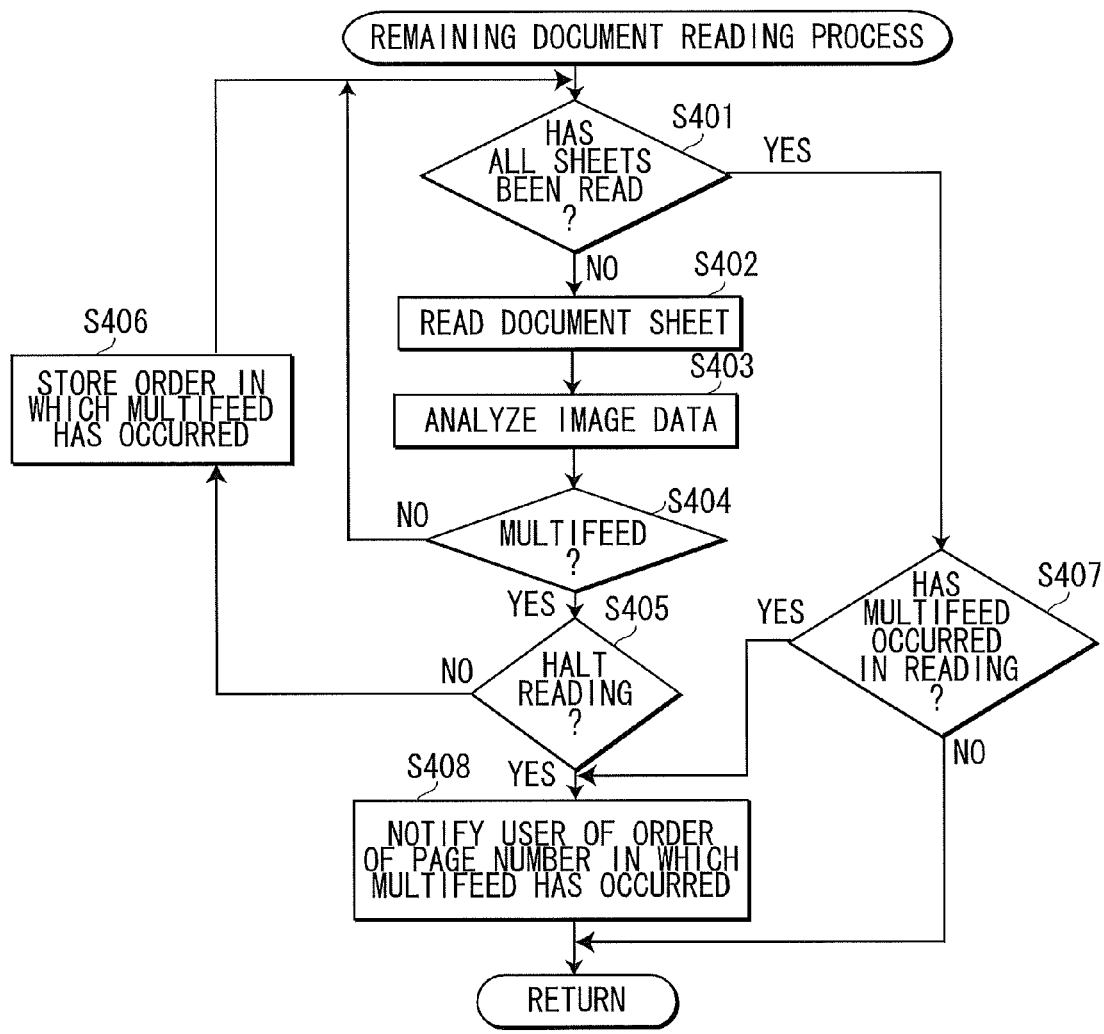
FIG. 13 is a flowchart illustrating a remaining document reading process in the document reading process.

Next, the remaining document reading process executed in S106 will be explained with referring to FIG. 13. In S401, the CPU 30b determines whether or not the reading of the document sheets stacked on the stack tray 15 has been completed.

When a result of the determination is negative, the CPU 30b proceeds to S402; while when the determination result is affirmative, the CPU 30b proceeds to S407.

In S402, the CPU 30b controls and allows the individual components of the image scanner 1 to read one document sheet to generate image data. In S403, the CPU 30b analyzes the generated image data. This analysis is performed according to the criterion selected in S104 or S105. For example, when the criterion 1 or criterion 2 has been selected, the page numbers are extracted; while when the criterion 3 has been selected, the sheet size is detected.

In S404, the CPU 30b determines whether or not the multifeed has occurred based on a result of the analysis of S403 according to the selected criterion.

When a result of the determination is affirmative, the CPU 30b proceeds to S405; while when the determination result is negative, the CPU 30b returns to S401.

Specifically, when the criterion 1 or 2 is selected, the CPU 30b, the CPU 30b analyzes image data to acquire a page number of a corresponding sheet in S403 and determines that the sheet is actually fed while being overlapped with another sheet of the original document if the page number of the sheet is unmatched with the reading order at which the reading unit 19 reads the sheet in S404. When the criterion 3 is selected, the CPU 30b determines a size of a sheet in S403 and determines that a sheet having a size different from the size of the first sheet is actually fed while being overlapped with another sheet of the original document in S404. When the criterion 4 is selected, the CPU 30b determines the margin area size and the image area size in S403, the CPU 30b determines that a sheet having at least one of: a margin area whose size is different from the size of the margin area in the first sheet; and an image area whose size is different from the size of the image area in the first sheet is actually fed while being overlapped with another sheet of the original document in S404. When the criterion 6 is selected, the CPU 30b judges whether or not an order of generating monochrome/color image data corresponding to a sheet is identical to an order of reading the monochrome/color image sheet in S403 and determines that a sheet is actually fed while being overlapped with another sheet when the orders is not identical to each other in S404.

In S405, the CPU 30b determines whether or not the read processing is stopped. Specifically, the user can set whether to stop or not the read processing when the occurrence of the multifeed has been determined. When the stop of the read processing has not been set, the CPU 30b proceeds to S406; while when the stop of the read processing has been set, the CPU 30b stops the read processing and proceeds to S408.

In S406, the CPU 30b stores the order at which the multifeed has occurred. In S407, when the occurrence of the multifeed is determined once or more, the CPU 30b proceeds to S408; while when the occurrence of the multifeed has not been determined, the CPU 30b ends this routine to return the document reading process.

In S408, the CPU 30b ends the read processing of the document sheets and notifies the user of the order at which the multifeed has occurred. For example, when the second document sheet and third document sheet have been multi-fed, the CPU 30b notifies the user of information indicating that the second document sheet and third document sheet have been multi-fed.

The image scanner 1 according to the first embodiment of the invention has the following advantages. For example, assume that the criterion for determining whether the multifeed has occurred or not is fixed to a criterion that determines the occurrence of the multifeed when there is a discontinuous change in the page numbers. In this case, in the case where the page number does not appear on each document sheet of the original document 5, whether the multifeed has occurred cannot be determined or there is a possibility that the occurrence of the multifeed is determined even though the multifeed has not actually occurred.

The image scanner 1 according to the first embodiment selects the criterion for determining the multifeed from among a plurality of criteria which are prepared for each candidate feature of the original document 5 so as to determine whether the multifeed has occurred or not, thereby determining whether the multifeed has occurred or not more reliably as compared to the case where the criterion is fixed.

Further, the image scanner 1 analyzes the image data generated as a result of reading of the part of the original document 5 to determine the feature possessed by the part of the document 5 and selects the criterion for determining whether or not the multifeed has occurred based on the determined feature, thereby reducing a burden on the user at the time of selection of the criterion as compared to, e.g., a case where the user inputs the feature of the original document 5. Further, the image scanner 1 selects the criterion based on the determined feature of the original document, thereby selecting the criterion that can determine whether the multifeed has occurred or not more reliably.

Further, in the case where the specific information is included in the content of the part of the original document 5, the image scanner 1 selects the criterion associated with the specific information. That is, the criterion corresponding to the feature of the original document 5 can be selected.

A second embodiment of the present invention will be explained. In the first embodiment, the image scanner 1 analyzes the image data to determine the feature possessed by the part of the original document 5 and selects the criterion that determines whether the multifeed has occurred or not based on the determined feature. In the second embodiment, the user specifies the criterion, and the image scanner 1 selects the criterion specified by the user. The specification of the criterion can be made using the above-mentioned criterion specifying screen 52.

In the second embodiment, the user specifies the criterion before ordering execution of the read processing of the document sheets. Then, in the second embodiment, when the user orders the execution of the read processing of the document sheets, the remaining document reading process as described in the first embodiment is directly called. In the remaining document reading process, the CPU 30b compares a result of the analysis of S403 with the criterion specified by the user to determine whether the multifeed has occurred or not.

As described above, the image scanner 1 according to the second embodiment allows the user to specify the criterion for determining whether the multifeed has occurred or not more reliably.

Figure 14:
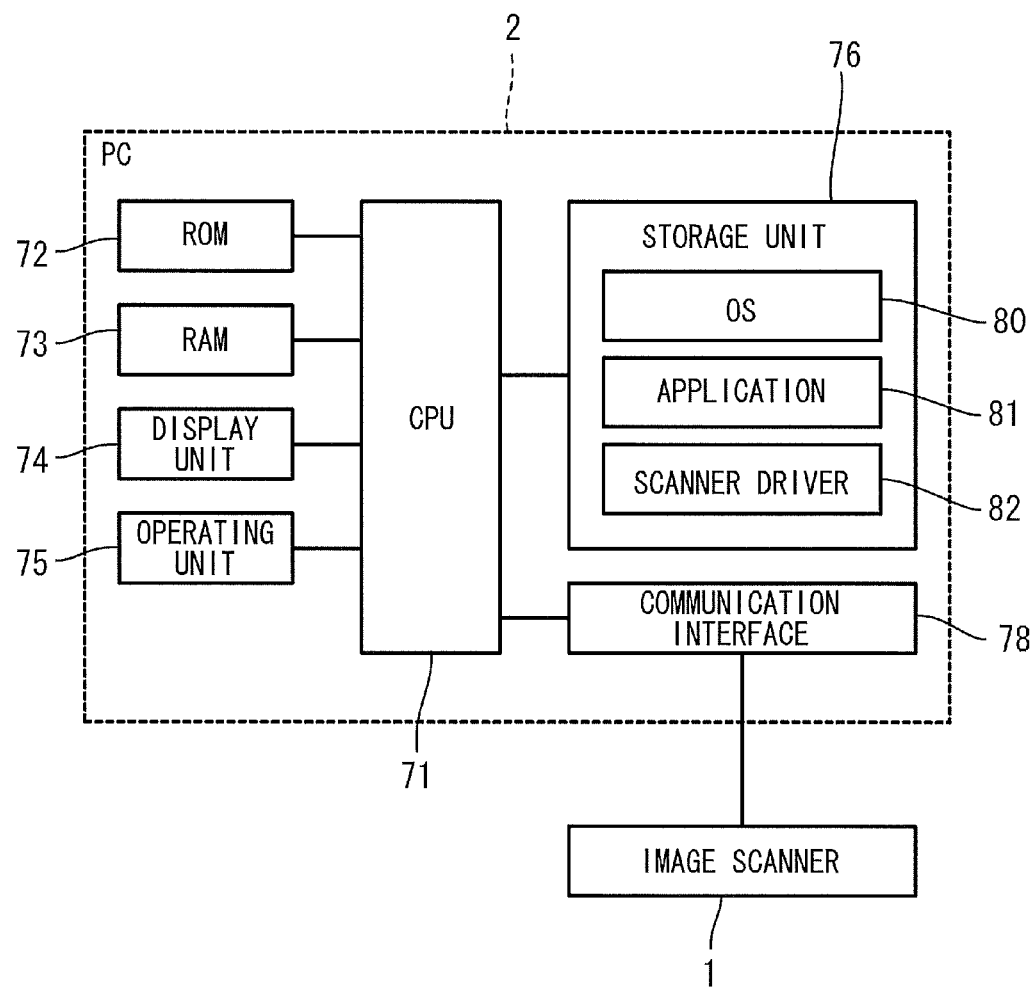
FIG. 14 is a block diagram showing an electrical structure of a system including an image processing device and an image reading device according to a third embodiment of the present invention.

Next, a personal computer (PC) 2 according to a third embodiment of the present invention with referring to FIG. 14. As shown in FIG. 14, the PC 2 connected to the image scanner 1 and includes a CPU 71, a ROM 72, a RAM 73, a display unit 74, an operation unit 75, a storage unit 76, and a communication interface 78. The CPU 71 executes various programs stored in the ROM 72 and storage unit 76 to control individual components of the PC 2. The ROM 72 stores a control program executed by the CPU 71 and various data. The RAM 73 is used as a main storage device for the CPU 71 to execute various processing.

The display unit 74 includes a display device such as a liquid crystal display, and a drive circuit for driving the display device. The operation unit 75 includes a mouse, a keyboard, and the like. The storage unit 76 is a device for storing various programs and data by using a nonvolatile storage medium such as a hard disk and flash memory. The storage unit 76 stores operating system (OS) 80, application program 81, scanner driver 82. The communication interface 78 is an interface connected to a communication network such as a LAN (Local Area Network), a USB (Universal Serial Bus), or a parallel line so as to allow the PC 2 to perform communication with the image scanner 1.

The PC 2 executes the scanner driver 82 to execute a PC scan. In this PC scan, the PC 2 instructs the image scanner 1 to read the document sheets and acquires, from the image scanner 1, image data generated by the image scanner 1 reading the document sheets.

The document reading process, selection processing based on the indirect determination, selection processing based on the direct determination, and remaining document reading process which are executed by the CPU 30b of the image scanner 1 in the first embodiment. In the third embodiment these processing are executed by the CPU 71 executing the scanner driver 82. In other points, the third embodiment is substantially the same as the first embodiment, so that the detailed description will be omitted. According to the scanner driver 82 of the third embodiment, whether the multifeed has occurred or not can be determined more reliably.

While the invention has been described in detail with reference to the first, second, and third embodiments thereof, it would be apparent to those skilled in the art that various changes and modifications may be made therein without departing from the spirit of the invention.

(1) Although processes in the document reading process are executed by the CPU 30b in the first embodiment, they may be executed by a plurality of CPUs or ASICs.

(2) In the first embodiment, the features possessed by the part of the original document 5 are sequentially determined, and then the criterion for determining whether the multifeed has occurred or not is selected based on the feature that has been first determined to be possessed by the part of the original document 5. Alternatively, however, all the features may previously be determined, and all the criteria corresponding to the features that have been determined to be possessed by the part of the original document 5 may be selected.

For example, assume that both the feature "page number appears on all the document sheets" and feature "document sheets of the original document 5 have the same size" are possessed by the part of document group 5. In this case, both the criterion 1 and criterion 3 may be selected, and the occurrence of the multifeed may be determined when it has been determined based on any one of the criteria.

(3) Although the features possessed by the part of the original document 5 are determined by a specific order in the first embodiment, the order in which the features are determined is not limited to the order described in the first embodiment but may arbitrarily be set.

(4) Although the entire feature of the original document 5 is estimated based on some document sheets of the original document 5 in the first embodiment, the feature of the original document 5 may be input by the user. For example, in the case where the page number appears on all the document sheets to be read, the user may operate the operating unit 38 of the image scanner 1 to select a checkbox "page number appears on all the document sheets", and the image scanner 1 may select the criterion 1 when the checkbox has been selected.

(5) In the first embodiment, the entire feature of the original document 5 is estimated based on some document sheets of the original document 5, and the criterion for determining whether the multifeed has occurred or not is selected based on the feature. However, in the second embodiment, the user specifies the criterion, and the image scanner 1 selects the criterion specified by the user. Which one of the above methods is used to select the criterion may be selected by the user.

(6) In the above embodiments, the image scanner 1 has been taken as an example of the image reading device. Alternatively, however, the image reading device may be a copying machine that prints image data generated as a result of reading of document sheets, a facsimile machine that faxes image data generated as a result of reading of document sheets, or a multifunction machine having a printer function, a scanner function, a copier function, and a facsimile function.

(7) In the above embodiments, the criteria (page number, specific character string, sizes of the image area G and margin area W, etc.) of the part of the read document sheets are hard-coded in the read control program. Alternatively, however, some features of the read document sheets and criteria corresponding thereto may be stored in the ROM 30a. In this case, the ROM 30a may be referred to when the criterion is selected.

Further, in the above embodiments, the character strings such as "Publication of Unexamined Patent Application" are hard-coded in the read control program. Alternatively, however, a correspondence table including the character strings and corresponding criterion thereof may be stored in the ROM 30a. In this case, in S102, a given character string stored in the correspondence table is recognized, and the criterion stored in association with the recognized character string is selected.

What is claimed is:

1. An image reading device comprising:
  a stack portion in which an original document including a plurality of sheets is stacked;
  a feeding unit configured to feed the plurality of sheets one by one;
  a reading unit configured to read an image on each of the plurality of sheets fed by the feeding unit and generate image data representing the image; and
  a processor configured to function as:
    a first analyzing unit configured to analyze at least one set of image data corresponding to at least one image on at least one of the plurality of sheets actually fed by the feeding unit and determine a feature of the original document based on the at least one set of image data;
    a selecting unit configured to select, from among a plurality of criteria, a criterion preset for the feature determined by the first analyzing unit, each of the plurality of criteria being a criterion for determining whether or not a sheet of the original document is fed while being overlapped with another sheet of the original document; and a determining unit configured to use the image data corresponding to the image on a sheet of the original document to determine, according to the criterion selected by the selecting unit, whether or not the sheet of the original document is actually fed while being overlapped with another sheet of the original document, wherein the processor is further configured to function as a second analyzing unit configured to analyze remaining sets of image data other than the at least one set of image data, the remaining sets of image data corresponding to remaining sheets of the plurality of sheets other than the at least one of the plurality of sheets, wherein the determining unit determines, based on the criterion selected by the selecting unit and a result of analyzing the remaining sets of image data, whether or not a sheet of the remaining sheets is actually fed while being overlapped with another sheet of the original document, wherein the at least one of the plurality of sheets includes a first sheet and a second sheet, the at least one set of image data including first image data corresponding to the first sheet and second image data corresponding to the second sheet, wherein, when the first analyzing unit analyzes the first image data and the second image data and determines that the second sheet has a size that is the same as a size of the first sheet, the selecting unit selects a second criterion from among the plurality of criteria, wherein, when the selecting unit selects the second criterion, the second analyzing unit analyzes each of the remaining sets of image data and determines a size of a sheet corresponding to the each of the remaining sets of image data, and wherein the determining unit determines that a sheet of the remaining sheets that has a size different from the size of the first sheet is actually fed while being overlapped with another sheet of the original document.

2. The image reading device according to claim 1, wherein the plurality of criteria is preset for respective ones of a plurality of candidate features that could be possessed by the original document.

3. The image reading device according to claim 1,
wherein an image read on each of the plurality of sheets includes a margin area and an image area other than the margin area,
wherein, when the first analyzing unit analyzes the first image data and the second image data and determines that a margin area in the second sheet has a size that is the same as a size of a margin area in the first sheet, the selecting unit selects a third criterion from the plurality of criteria,
wherein, when the selecting unit selects the third criterion, the second analyzing unit analyzes each of the remaining sets of image data and determines a size of a margin area in a remaining sheet corresponding to the each of the remaining sets of image data, and
wherein the determining unit determines that a sheet of the remaining sheets that has a margin area whose size is different from the size of the margin area in the first sheet is actually fed while being overlapped with another sheet of the original document.

4. The image reading device according to claim 1,
wherein an image read on each of the plurality of sheets includes a margin area and an image area other than the margin area,
wherein, when the first analyzing unit analyzes the first image data and the second image data and determines that an image area in the second sheet has a size that is the same as a size of an image area in the first sheet, the selecting unit selects a fourth criterion from among the plurality of criteria,
wherein, when the selecting unit selects the fourth criterion, the second analyzing unit analyzes each of the remaining sets of image data to determine a size of an image area in a sheet corresponding to the each of the remaining sets of image data, and
wherein the determining unit determines that a sheet of the remaining sheets that has an image area whose size is different from the size of the image area in the first sheet is actually fed while being overlapped with another sheet of the original document.

5. The image reading device according to claim 1, further comprising a storing unit storing the plurality of criteria and a plurality of specified information, each of the plurality of specified information corresponding to one of the plurality of criteria,
wherein the first analyzing unit analyzes the at least one set of the image data and determines whether or not one of the plurality of specified information is included in an image read from each of the at least one of the plurality of sheets, and
wherein, when the first analyzing unit determines that the one of the plurality of specified information is included in an image read from each of the at least one of the plurality of sheets, the selecting unit selects, from among the plurality of criteria, a criterion corresponding to the one of the plurality of specified information.

6. The image reading device according to claim 5,
wherein the one of the plurality of specified information is a predetermined character string,
wherein, when the first analyzing unit determines that the predetermined character is included in an image read from each of the at least one of the plurality of sheets, the selecting unit selects a fifth criterion corresponding to the predetermined character string from among the plurality of criteria,
wherein, when the selecting unit selects the fifth criterion, the second analyzing unit analyzes each of the remaining sets of image data and acquires a page number included in an image read from a sheet corresponding to the each set of remaining image data, and
wherein, if a difference between two page numbers acquired from two sets of remaining image data generated consecutively is greater than one, the determining unit determines that a remaining sheet corresponding to a page number between the two page numbers is actually fed while being overlapped with a remaining sheet corresponding to one of the two page numbers.

7. The image reading device according to claim 1,
wherein the processor is further configured to function as a judging unit configured to judge whether or not a sheet number of the plurality of sheets stacked on the stack portion is less than a threshold value,
wherein the image reading device further comprises an inputting unit enabling an input of a value indicative of the sheet number of the plurality of sheets if the judging unit judges the sheet number of the plurality of sheets stacked on the stack portion is less than the threshold value, and wherein, when a data number of image data sets generated by the reading unit is not identical to the value inputted, the determining unit determines that a sheet of the original document is actually fed while being overlapped with another sheet of the original document.

8. The image reading device according to claim 1, further comprising an inputting unit enabling an input of a reading order, the reading order indicating at least one of:
an order of reading sheets to be read as monochrome image sheets; and
an order of reading sheets to be read as color image sheets, wherein the processor is further configured to function as:
an order determining unit configured to determine, based on image data sets corresponding to the plurality of sheets, a generating order indicating at least one of:
an order in which image data corresponding to one of the monochrome image sheet is generated by the reading unit; and
an order in which image data corresponding to one of the color image sheets is generated by the reading unit; and
a judging unit configured to judge whether or not the generating order is identical to the reading order,
wherein, if the reading order is inputted through the inputting unit, the selecting unit selects a sixth criterion from among the plurality of criteria,
wherein, when the selecting unit selects sixth criterion, the judging unit judges whether or not the generating order is identical to the reading order, and
wherein when the judging unit judges that the generating order is not identical to the reading order, the determining unit determines that a sheet of the original document is actually fed while being overlapped with another sheet of the original document.

9. The image reading device according to claim 1, further comprising an inputting unit enabling manual selection of a criterion from among the plurality of criteria,
wherein the selecting unit selects the criterion selected through the inputting unit.

10. The image reading device according to claim 1, wherein the determining unit is configured to use both the image data corresponding to the image on the sheet of the original document and the image data corresponding to the image on the another sheet of the original document to determine, according to the criterion selected by the selecting unit, whether or not the sheet of the original document is actually fed while being overlapped with the another sheet of the original document, and
wherein the image data corresponding to the image on the sheet of the original document and the image data corresponding to the image on the another sheet of the original document form a single set of image data.

11. The image reading device according to claim 1, wherein the determining unit is configured to use only the image data corresponding to the image on the sheet of the original document to determine, according to the criterion selected by the selecting unit, whether or not the sheet of the original document is actually fed while being overlapped with the another sheet of the original document.

12. An image reading device comprising:
a stack portion in which an original document including a plurality of sheets is stacked;
a feeding unit configured to feed the plurality of sheets one by one
a reading unit configured to read an image on each of the plurality of sheets fed by the feeding unit and generate image data representing the image; and
a processor configured to function as:
a first analyzing unit configured to analyze at least one set of image data corresponding to at least one image on at least one of the plurality of sheets actually fed by the feeding unit and determine a feature of the original document based on the at least one set of image data;
a selecting unit configured to select, from among a plurality of criteria, a criterion preset for the feature determined by the first analyzing unit, each of the plurality of criteria being a criterion for determining whether or not a sheet of the original document is fed while being overlapped with another sheet of the original document; and
a determining unit configured to use the image data corresponding to the image on a sheet of the original document to determine, according to the criterion selected by the selecting unit, whether or not the sheet of the original document is actually fed while being overlapped with another sheet of the original document,
wherein the processor is further configured to function as a second analyzing unit configured to analyze remaining sets of image data other than the at least one set of image data, the remaining sets of image data corresponding to remaining sheets of the plurality of sheets other than the at least one of the plurality of sheets,
wherein the determining unit determines, based on the criterion selected by the selecting unit and a result of analyzing the remaining sets of image data, whether or not a sheet of the remaining sheets is actually fed while being overlapped with another sheet of the original document,
wherein, when the first analyzing unit determines, based on the at least one set of the image data, that each of the at least one of the plurality of sheets includes a page number therein, the selecting unit selects a first criterion from among the plurality of criteria,
wherein, when the selecting unit selects the first criterion, the second analyzing unit analyzes each of the remaining sets of image data to acquire a page number of a sheet corresponding to the each of the remaining sets of image data, and
wherein the determining unit determines that a sheet whose page number is unmatched with a reading order in which the reading unit reads the plurality of sheets is actually fed while being overlapped with another sheet of the original document.

13. A non-transitory computer readable storage medium storing a set of computer-readable program instructions that, when executed by a computer, instruct the computer to perform processes comprising:
analyzing at least one set of image data corresponding to at least one image on at least one of a plurality of sheets of an original document actually fed by a feeder of an image reading device;
determining a feature of the original document based on the at least one set of image data;
selecting, from among a plurality of criteria, a criterion preset for the determined feature of the original document, each of the plurality of criteria being a criterion for determining whether or not a sheet of the original document is fed by the feeder of the image reading device while being overlapped with another sheet of the original document; and using the image data corresponding to the image on a sheet of the original document to determine, according to the selected criterion, whether or not the sheet of the original document is actually fed while being overlapped with another sheet of the original document, wherein the plurality of criteria is preset for respective ones of a plurality of candidate features that could be possessed by the original document, wherein the program instructions, when executed by the computer, further instruct the computer to perform processes comprising analyzing remaining sets of image data other than the at least one set of image data, the remaining sets of image data corresponding to remaining sheets of the plurality of sheets other than the at least one of the plurality of sheets, wherein the determining process includes determining whether or not a sheet of the remaining sheets is actually fed while being overlapped with another sheet of the original document based on the criterion selected in the selecting process and a result of analyzing the remaining sets of image data, wherein the at least one of the plurality of sheets includes a first sheet and a second sheet, the at least one set of image data including first image data corresponding to the image on the first sheet and second image data corresponding to the image on the second sheet, wherein, when the first image data and the second image data and is analyzed and it is determined that the second sheet has a size that is the same as a size of the first sheet, the selecting process includes selecting a second criterion from among the plurality of criteria, wherein, when the second criterion is selected, analyzing the remaining sets of image data includes analyzing each of the remaining sets of image data and determining a size of a sheet corresponding to the each of the remaining sets of image data, and wherein using the image data corresponding to the image on the sheet of the original document to determine whether or not the sheet of the original document is actually fed while being overlapped with another sheet of the original document includes determining that the sheet is actually fed while being overlapped with another sheet of the original document when the sheet, which is one of the remaining sheets, has a size that is different from the size of the first sheet.

14. The non-transitory computer readable storage medium according to claim 13, wherein, when it is determined, based on the at least one set of the image data, that the feature of the original document is that each of the at least one of the plurality of sheets includes a page number therein, the selecting process includes selecting a first criterion from among the plurality of criteria, wherein when the first criterion is selected, analyzing the remaining sets of image data includes analyzing each of the remaining sets of image data to acquire a page number of a sheet corresponding to the each of the remaining sets of image data, and wherein using the image data corresponding to the image on the sheet of the original document to determine whether or not the sheet of the original document is actually fed while being overlapped with another sheet of the original document includes determining that the sheet is actually fed while being overlapped with another sheet of the original document when the page number of the sheet is unmatched with a reading order in which a reading unit of the image reading device reads the plurality of sheets.

15. The non-transitory computer readable storage medium according to claim 13, wherein an image read on each of the plurality of sheets includes a margin area and an image area other than the margin area, wherein, when the first image data and the second image data is analyzed and it is determined that a margin area in the second sheet has a size that is the same as a size of a margin area in the first sheet, the selecting process includes selecting a third criterion from the plurality of criteria, wherein, when the third criterion is selected, analyzing the remaining sets of image data includes analyzing each of the remaining sets of image data and determining a size of a margin area in a remaining sheet corresponding to the each of the remaining sets of image data, and wherein it is determined that a sheet of the remaining sheets that has a margin area whose size is different from the size of the margin area in the first sheet is actually fed while being overlapped with another sheet of the original document.

16. The non-transitory computer readable storage medium according to claim 13, wherein an image read on each of the plurality of sheets includes a margin area and an image area other than the margin area, wherein, when the first image data and the second image data is analyzed and it is determined that an image area in the second sheet has a size that is the same as a size of an image area in the first sheet, the selecting process includes selecting a fourth criterion from among the plurality of criteria, wherein, when the fourth criterion is selected, analyzing the remaining sets of image data includes analyzing each of the remaining sets of image data to determine a size of an image area in a sheet corresponding to the each of the remaining sets of image data, and wherein it is determined that a sheet of the remaining sheets that has an image area whose size is different from the size of the image area in the first sheet is actually fed while being overlapped with another sheet of the original document.

17. The non-transitory computer readable storage medium according to claim 13, wherein analyzing the at least one set of image data includes analyzing the at least one set of the image data and determining whether or not one of a plurality of specified information is included in an image read from each of the at least one of the plurality of sheets, wherein each of the plurality of specified information corresponds to one of the plurality of criteria, and wherein, when it is determined that the one of the plurality of specified information is included in an image read from each of the at least one of the plurality of sheets, the selecting process includes selecting, from among the plurality of criteria, a criterion corresponding to the one of the plurality of specified information.

18. The non-transitory computer readable storage medium according to claim 17, wherein the one of the plurality of specified information is a predetermined character string, wherein, when the it is determined that the predetermined character is included in an image read from each of the at least one of the plurality of sheets, the selecting process includes selecting a fifth criterion corresponding to the predetermined character string from among the plurality of criteria, wherein, when fifth criterion is selected, analyzing the remaining sets of image data other than the at least one set of image data includes analyzing each of the remaining sets of image data and acquiring a page number included in an image read from a sheet corresponding to the each set of remaining image data, and wherein, when a difference between two page numbers acquired from two sets of remaining image data generated consecutively is greater than one, it is determined that a remaining sheet corresponding to a page number between the two page numbers is actually fed while being overlapped with a remaining sheet corresponding to one of the two page numbers.

19. The non-transitory computer readable storage medium according to claim 13, wherein the program instructions, when executed by the computer, further instruct the computer to perform processes comprising:

judging whether or not a sheet number of the plurality of sheets stacked on the stack portion is less than a threshold value; and enabling an input of a value indicative of the sheet number of the plurality of sheets when it is judged that the sheet number of the plurality of sheets stacked on the stack portion is less than the threshold value, and wherein, when a data number of image data sets generated by the reading unit is not identical to the value inputted, it is determined that a sheet of the original document is actually fed while being overlapped with another sheet of the original document.

20. The non-transitory computer readable storage medium according to claim 13, wherein the determining process uses both the image data corresponding to the image on the sheet of the original document and the image data corresponding to the image on the another sheet of the original document to determine, according to the criterion selected in the selecting process, whether or not the sheet of the original document is actually fed while being overlapped with the another sheet of the original document, and wherein the image data corresponding to the image on the sheet of the original document and the image data corresponding to the image on the another sheet of the original document form a single set of image data.

* * * * *